US010482013B2

(12) United States Patent
Johnson et al.

(10) Patent No.: US 10,482,013 B2
(45) Date of Patent: Nov. 19, 2019

(54) ELIDING MEMORY PAGE WRITES UPON EVICTION AFTER PAGE MODIFICATION

(71) Applicant: Hewlett Packard Enterprise Development LP, Houston, TX (US)

(72) Inventors: Charles S. Johnson, San Jose, CA (US); Harumi Kuno, Cupertino, CA (US); Goetz Graefe, Madison, WI (US); Haris Volos, Palo Alto, CA (US); Mark Lillibridge, Mountain View, CA (US); James Hyungsun Park, Palo Alto, CA (US); Wey Guy, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 11 days.

(21) Appl. No.: 15/513,407

(22) PCT Filed: Sep. 30, 2014

(86) PCT No.: PCT/US2014/058381
§ 371 (c)(1),
(2) Date: Mar. 22, 2017

(87) PCT Pub. No.: WO2016/053313
PCT Pub. Date: Apr. 7, 2016

(65) Prior Publication Data
US 2017/0300412 A1 Oct. 19, 2017

(51) Int. Cl.
*G06F 12/0804* (2016.01)
*G06F 12/0868* (2016.01)
(Continued)

(52) U.S. Cl.
CPC ...... *G06F 12/0804* (2013.01); *G06F 11/1446* (2013.01); *G06F 11/1474* (2013.01);
(Continued)

(58) Field of Classification Search
CPC ............. G06F 11/1446; G06F 12/0804; G06F 12/0868; G06F 12/12; G06F 2212/1016
See application file for complete search history.

(56) References Cited

U.S. PATENT DOCUMENTS 5,418,940 A 5/1995 Mohan
7,613,945 B2 11/2009 Soran et al.
(Continued)

FOREIGN PATENT DOCUMENTS

WO WO-2006020711 2/2006

OTHER PUBLICATIONS

Provost, how Caching Works, howitworks.com, 2006 [retrieved from internet Jun. 29, 2018][<URL:https://web.archive.org/web/20061207035914/http://computer.howstuffworks.com:80/cache2.htm>] (Year: 2006).*
(Continued)

*Primary Examiner* — Daniel D Tsui
*Assistant Examiner* — Nicholas A. Paperno
(74) *Attorney, Agent, or Firm* — Hewlett Packard Enterprise Patent Department

(57) ABSTRACT

Systems and methods associated with page modification are disclosed. One example method may be embodied on a non-transitory computer-readable medium storing computer-executable instructions. The instructions, when executed by a computer, may cause the computer to fetch a page to a buffer pool in a memory. The page may be fetched from at least one of a log and a backup using single page recovery. The instructions may also cause the computer to store a modification of the page to the log. The modification
(Continued)

may be stored to the log as a log entry. The instructions may also cause the computer to evict the page from memory when the page is replaced in the buffer pool. Page writes associated with the eviction may be elided.

15 Claims, 8 Drawing Sheets

(51) Int. Cl.
*G06F 12/12* (2016.01)
*G06F 11/14* (2006.01)

(52) U.S. Cl.
CPC .......... *G06F 12/0868* (2013.01); *G06F 12/12* (2013.01); *G06F 2201/80* (2013.01); *G06F 2212/1016* (2013.01)

(56) References Cited

U.S. PATENT DOCUMENTS

| | | | |
|---|---|---|---|
| 7,966,298 | B2 | 6/2011 | Bruso et al. |
| 9,552,242 | B1* | 1/2017 | Leshinsky ............ G06F 11/0727 |
| 2007/0214191 | A1 | 9/2007 | Chandrasekaran |
| 2007/0239938 | A1* | 10/2007 | Pong .................. G06F 12/0846 711/122 |
| 2012/0030408 | A1* | 2/2012 | Flynn .................. G06F 12/0246 711/102 |
| 2012/0072652 | A1 | 3/2012 | Celis et al. |
| 2013/0013874 | A1* | 1/2013 | Graefe ................ G06F 11/1469 711/162 |
| 2016/0246734 | A1* | 8/2016 | Greenspan ............ G06F 12/122 |
| 2017/0060434 | A1* | 3/2017 | Chang .................... G06F 3/061 |

OTHER PUBLICATIONS

Berg, V.D. et al., "Dynamic Query Processing in a Parallel Object-Oriented Database System", (Research Paper), Feb. 25, 1994, 185 Pgs.
Fishman, D.H. et al., "Overview of the Jasmin Database Machine", (Research Paper), 1984, 6 pages.
Goetz Graefe et al, Definition, Detection, and Recovery of Single-Page Failures, a Fourth Class of Database Failures, Aug. 2012, 10 Pgs.
International Searching Authority, The International Search Report and the Written Opinion, PCT/US2014/058381, dated May 29, 2015, 13 Pgs.
Ives, Z.G., "Efficient Query Processing for Data Integration", (Research Paper), 2002, 202 Pgs.
Bernstein et al., "Hyder—A Transactional Record Manager for Shared Flash", 5th Biennial Conference on Innovative Data Systems Research (CIDR '11), available online at < http://cidrdb.org/cidr2011/Papers/CIDR11_Paper2.pdf >, Jan. 9-12, 2011, pp. 9-20.

* cited by examiner

ELIDING MEMORY PAGE WRITES UPON EVICTION AFTER PAGE MODIFICATION

BACKGROUND

Databases today rely on three components. First, an in-memory (e.g., a random access memory (RAM), a cache) buffer pool stores pages that are currently being accessed and/or modified by active transactions. Second, possibly out-of-date versions of the pages in memory are stored in a media that persist the entire contents of the database. Finally, a log of modifications to pages is kept to ensure that modifications made to the database are not lost in the event of a failure of a component of the database.

Thus, when a transaction attempts to access and/or modify a database entry that is not already in the buffer pool, a page in which the database entry resides is fetched from the media to the buffer pool, where the transaction (e.g., via a processor) operates on the database entry. When modifications are made to a page and/or database entry, these modifications are written to the log before the modification is stored in the media by writing the page back to the media or applying the modification to the page on the media. For example, if a modified page is removed from the buffer pool because it is no longer needed in memory or when the space in the buffer pool is needed for other pages, then the modifications are first made to the log before the modified page is written back to the media. These techniques are generally referred to as write-ahead logging.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
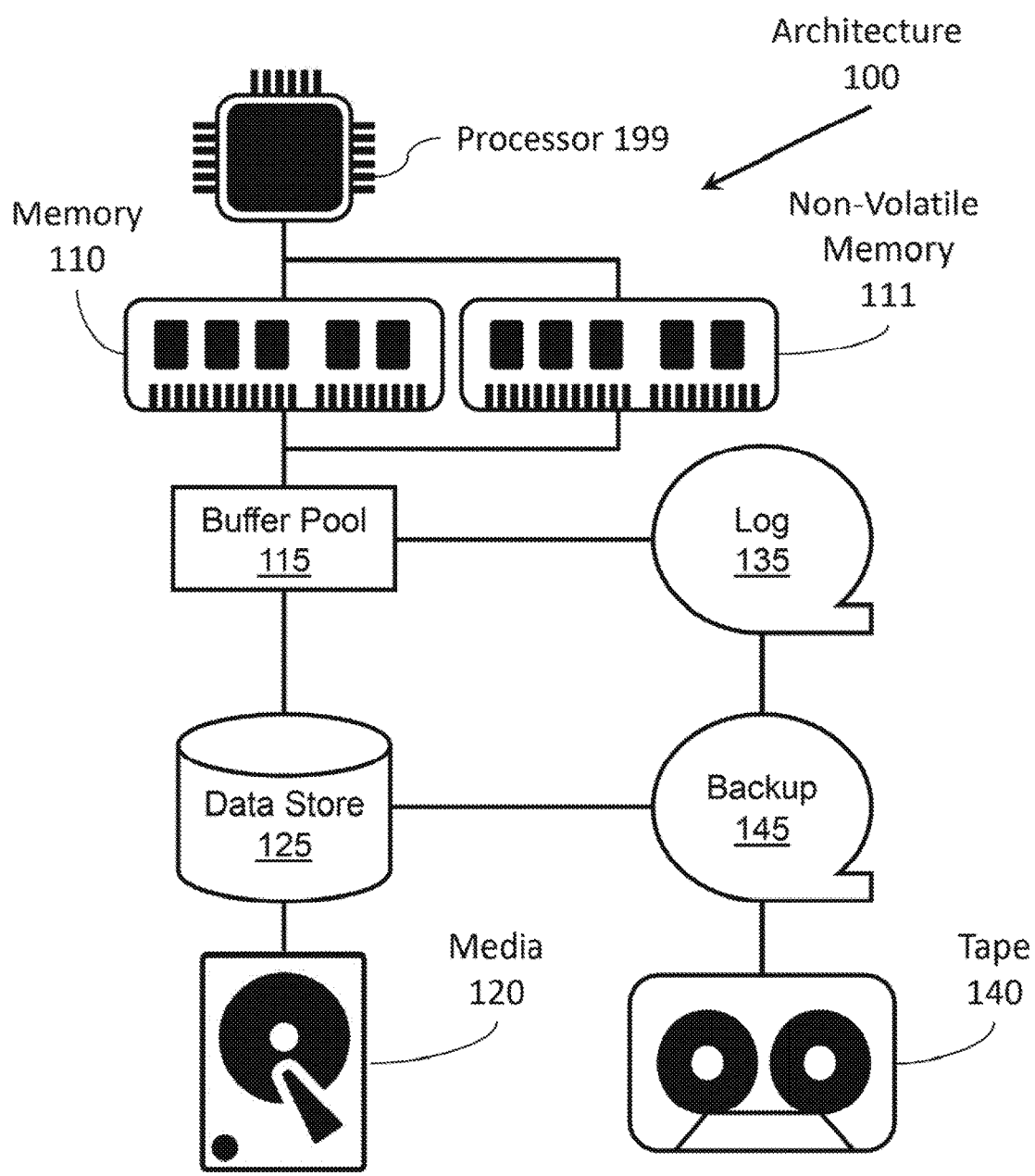
FIG. 1 illustrates example physical and logical components in which example systems and methods, and equivalents may operate.

Systems and methods associated with page fetching and eviction are described. In various examples, page fetching may be achieved by applying single page recovery techniques to an image of a page in a page log and log entries associated with the page. This may construct a current version of the page when the page is accessed by, for example, a database, causing the page to be fetched into a faster memory (e.g., RAM, a cache). When modifications are made to the page, log entries describing these modifications may be stored to a durable medium, for example, an active log. When the page is replaced in memory by a different page, the page may be evicted from the memory. Though some systems might perform a memory write of the page to store the updated version of the page, in various examples, this page write may be elided, thereby freeing I/O bandwidth and removing the need to have a write-accessible media copy of the databases local to the memory.

Generally, databases use a transient memory, such as a buffer pool, to store in-memory copies or images of working data. The data access times for the transient memory are less than data access times for mass storage devices (e.g., hard disks). Working data may be understood as the data which is processed by a database system. The working data associated with the database may include data fetched from the database's persistent storage media, or may also include data which is produced as a result of processing other data.

As mentioned above, the working data may be fetched from a possibly slower memory, such as a disk, where such data is maintained in a persistent storage. Once the data is fetched, it is placed in the faster, possibly transient memory. These faster memories may include, for example, volatile DRAM, phase change memory, memristor, and so forth. Examples of memories which store data in a persistent state include, for example, magnetic (spinning) disk, solid state (e.g., flash) drives, phase change memories, memristors, and so forth. For these persistent storage mediums, the access times may be generally larger than transient memories.

Within the buffer pool, the data may be further processed depending on one or more search requests, processing requests, and so forth. The buffer pool in turn may be logically composed of an array of frames. A frame may store an in-memory image of a page. Consequently, each page may be considered to store portions of data which may be processed. It is in the frames that the buffer pool stores data in-memory, as page images. The buffer pool may be used to enable fast, in-memory processing of data, including data stored on volatile or non-volatile memory. For example, the buffer pool may enable fast local in-memory processing of data stored on a remote memory. In this manner, a buffer pool may offer a storage medium that is faster and easier to access than a persistent storage medium.

As non-volatile memory technologies approach volatile DRAM speeds, it may be possible that database systems will dispense with DRAM and primarily rely on non-volatile memory. In this case, a CPU cache may take the place of the faster, possibly transient memory to store in-memory copies of images of working data.

FIG. 1 illustrates example physical and logical components in which example systems and methods, and equivalents may operate. It should be appreciated that the physical and logical components are illustrative examples and many different system designs may be appropriate. Though this description includes many examples, references, and illustrations involving "databases", the techniques, systems, and methods disclosed herein may also be applicable to other management approaches. For example, disclosed systems and methods may also be appropriate for file systems, NoSQL systems, other transactional memory based systems, and so forth.

In one example, FIG. 1 illustrates an example architecture 100 of a database. Architecture 100 includes a data store 125 in which the contents of the database may be stored. The data store may be organized, for example, as a set of B-Trees containing pages of database entries that may be retrieved and modified during the operation of the database. Data store 125 may be embodied on a media 120 which may be, for example, a hard disk or other storage media. In another example, data store 125 may be embodied in non-volatile memory 111, which may be, for example, a phase change memory device, a memristor device, and so forth.

During the operation of the database, when a database entry is accessed, a page containing that database entry may be fetched from data store 125 to buffer pool 115. Buffer pool 115 may be embodied within a memory 110 such as a stick of RAM or a cache within architecture 100. Pages may be fetched to memory 110, so that a processor 199 can access contents of pages faster than if processor 199 had to retrieve pages from media 120 every time a transaction wanted to modify or read a page. Processor 199 may execute transactions and/or perform other operations associated with the database.

As processor 199 performs transactions on pages within memory 110, these transactions may cause entries within the pages to be modified. To preserve these modifications, write ahead logging may be employed to ensure that modifications are committed to a log 135 in the form of log entries before taking actions based on the modifications. Log 135 may be located on media 120 or within non-volatile memory 111 for momentary durability of transaction state in case of a system crash. This may ensure, for example, that a bank customer's account balance is updated durably before the customer is handed cash by a teller.

When a page is no longer needed in buffer pool 115 (e.g., because the page is no longer associated with active transactions being performed by processor 199, because an active transaction needs additional space in memory 110), the page may be evicted from buffer pool 115 and, if modifications were made to the page, the page may be written back to data store 125. This write preserves the most recent state of the page back to data store 125. In some circumstances, pages that have been modified may also be periodically written from buffer pool 125 to data store 125 to attempt to mitigate the time a system restoration might take in the event of a crash, power failure, or other failure of, for example, processor 199, memory 110, and so forth.

Additionally, the contents of data store 125 and log 135 may be periodically backed up to a backup 145 to mitigate a failure of, for example, media 120 or non-volatile memory 111. Backup 145 may be embodied, for example, on a tape drive 140, on another storage media, at a remote location, and so forth.

Because committed transactions may have modified database entries in pages that have not yet been written to data store 125, and because buffer pool 115 may contain database entries that were modified by presently uncommitted transactions, neither data store 125 nor buffer pool 115 contains a "current" state of the database. In modern systems, in the event of a crash, an up-to-date state of the database is retrieved by loading an out-of-date copy of the database from backup 145 to a replacement media, and then modifying the out-of-date copy according to log entries. Consequently, the combination of backup 145 and log 135 may be merged to retrieve a present state of the database, effectively meaning the "current" state of the database resides within log 135.

Consequently, systems and methods described herein may achieve the functionality of a page fetch from data store 125 by applying single page recovery techniques to page images stored within log 135, and log entries associated with the page images. Single page recovery techniques include loading a page image, and then modifying the page image according to log entries associated with the page until the page is more up-to-date. In some examples, the page image may be retrieved from a page log in log 135, or from backup 145. Further, by eliding page writes associated with an eviction of a page from buffer pool 115, data store 125 may be bypassed, potentially eliminating data store 125, and consequently media 120, from architecture 100.

Modifications to pages associated with committed transactions may be store as log entries into log 135. If one of these pages is subsequently evicted from buffer pool 115, and then needs to be re-fetched, single page recovery may be re-performed on that page to fetch an updated version of that page back into buffer pool 115.

In some examples, log 135 may have a background cleaning process operating while there are processing resources available. The cleaning process may apply modifications to page images (e.g., in a page log, in backup 145). The modifications may be identified in log entries associated with the page images. This cleaning process may ensure that the page images are kept at least somewhat up-to-date so that recovering the page does not involve an exhaustive rescan of log entries that have been associated with a page image since its creation. In one example, the cleaning process may employ single page recovery techniques to generate updated page images. In another example, a page fetch that invokes single page recovery may cause the page image to be updated with the most recent version of the page.

The background cleaning process may ensure that pages in the database maintain prefix consistency. Prefix consistency means that at any given point, a page image in a page log will have valid state that actually existed at some point in time. Guaranteeing prefix consistency may ensure that when a page image is accessed when performing single page recovery, all log entries may be played essentially in order to bring the page up-to-date, and no log entries found prior to creation of the page image need to be undone unless there is an appropriate undo log entry.

By way of illustration, consider a page storing two values A and B, and where before any transactions are performed A has a value of 10, and B has a value of 20. If a first transaction sets A to 15, and a second transactions sets B to 25, and where the first transaction occurred before the second transaction (e.g., because the first transaction was initiated before the second transaction), there are three potentially valid states for the page: the initial state where A has a value of 10 and B has a value of 20, an intermediary state where A has a value of 15 and B has a value of 20, and the final state where A has a value of 15 and B has a value of 25. If the page were ever to have a state where A has a value of 10 and B has a value of 25, prefix consistency would be violated.

Log 135 may include several types of entries. First, in examples where log 135 includes a page log, log 135 may include a full or sparse page log. A full page log may include images of all pages in the database, potentially serving a similar function as data store 125. However, pages in a full page log may not be kept as up-to-date as they would in databases where pages are written back to data store 125 upon eviction. In a sparse page log, the page log may serve essentially as an intermediary cache of recently accessed or more up-to-date pages so that the possibly more stale pages are not retrieved from backup 145 if they are accessed again in the near future.

Log 135 may also include redo entries. Redo entries may describe modifications made to pages associated with committed transactions. Thus, when a transaction commits, redo entries associated with pages modified by the transaction may be inserted into log 135. Log 135 may also include undo entries. In some circumstances, transactions may not fit within buffer pool 115, and a page that has uncommitted modifications may need to be evicted from buffer pool 115. In this case, a redo entry and a corresponding undo entry may be placed into log 135 associated with that page. If the transaction does not commit, a subsequent fetch of the page will see the redo entry and the undo entry, and either walk back the modification indicated in the redo entry, or skip performing the redo entry when bringing the page up-to-date. The undo entry may be removed or marked if the transaction that caused the undo entry to be placed into log 135 ultimately commits to ensure that a committed modification identified in a redo log entry is not undone.

Correspondingly, in a large system where crash consistency requires it, committed transactions may need to be rolled back to establish a larger prefix-consistency across many transactions and stores when a redo entry on one pipeline sharing a transaction dependency with other redo entries never makes it to the log before a crash. In this situation, undo entries may be necessary to roll back committed transactions for some modifications.

As mentioned above, page writes from memory 110 that modern systems might perform when evicting pages from memory 110 may be elided. By eliding page writes, writes from buffer pool 115 may be primarily to log 135 and may be focused on logging, instead of storing dirty pages to data store 125. This style of writing may be implemented as a marshaled serial write, and may have improved network and I/O performance over the split writing style that required both logging writes and page writes. Eliding page writes may be useful, because any given page may include several database entries, and only portions of the database entries may be modified by a given transaction. Consequently, by preserving modifications to the portions of the pages via log entries, eliding full page writes may reduce the amount of data that is written back to be preserved to media. For example, if a typical page has a size of four kilobytes, but most database entries take up less than 100 bytes, a modification to one of the database entries can be preserved by writing 100 bytes worth of data to the log, as opposed to 4100 bytes of data to the log and media (not including, for example, overhead associated with the write, and so forth).

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

Figure 2:
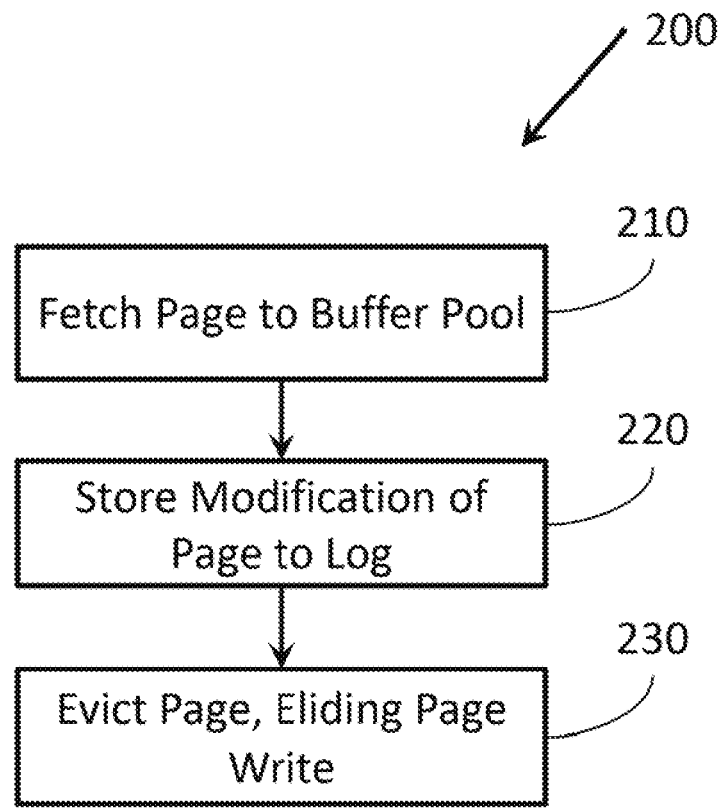
FIG. 2 illustrates a flowchart of example operations associated with page modification.

FIG. 2 illustrates a method 200 associated with page fetching and eviction. Method 200 may be embodied on a non-transitory computer-readable medium storing computer-executable instructions. The instructions, when executed by a computer may cause the computer to perform method 200. Method 200 includes fetching a page to a buffer pool at 210. The buffer pool may operate within a memory. The buffer pool may operate within, for example a RAM, cache, a non-volatile memory, and so forth. The page may be fetched from at least one of a log and a backup. The log may include several components. For example, the log may include a log buffer residing in the buffer pool, an active log, and a log archive. The log may also include a page log in which page images are stored. The backup may be a page archive (e.g., on tape).

In one example, the page may be fetched to the buffer pool using single page recovery. In another example, the page may be fetched and then subsequently updated using single page recovery if the page is found to be out-of-date. Thus, retrieving the page from the log may include retrieving an image of the page from the page log, and then applying log entries to the page that were added to the log after the page image was created to bring the page image up-to-date. Once the page image is up-to-date, the page image may be placed into the buffer pool at which point the page may be accessible by transactions.

In one example, the page may be stored and maintained in the log as a prefix-consistent page image and a series of linked log entries. Ensuring the page is stored and maintained as a prefix-consistent page image may facilitate swift loading of the page when it is fetched to the buffer pool because log entries that have a time stamp after the time the page image was created may be sequentially applied to the page without having to determine whether these log entries have already been applied to the page. Linking the log entries (e.g., using a series of pointers within the log entries), may facilitate swift updating of the page image by allowing a process fetching the page to quickly traverse log entries in the log without checking each log entry to determine whether it is associated with the page. The series of linked log entries may identify a sequence of modifications made to the page. The sequence of modifications may be ordered based on an ordering of transactions so that log entries associated with transactions performed first are replayed first when fetching the page at action 210.

Method 200 also includes storing a modification of the page to the log at 220. The modification may be stored, for example, when a transaction that caused the modification commits, when the page is evicted from the buffer pool, and so forth. The modification may be stored as a log entry. The log entry may be one of, for example, a redo entry, an undo entry, and so forth. The redo entry may describe modifications to make to the page image to bring the page image up-to-date. The undo entry may identify a redo entry to roll back to restore the page to a prior state.

As mentioned above, the log may comprise a log buffer, an active log, and a page log. In one example, the log buffer may serve a sa front end of a pipeline between the memory and the active log. Thus, when modifications to pages are made that need to be preserved, log entries describing those modifications may be placed initially into the log buffer until I/O bandwidth is available to store the log entry in the active log. Storage and handling of log entries (e.g., in the active log, in a log archive) may serve as a back end of the pipeline. Storage of log entries may include, for example, moving the log entries from the active log to a log archive after applying the log entries to their appropriate pages. The handling of log entries may comprise, for example, managing redo and undo entries, and log cleaning. Managing redo and undo entries may include, for example, identifying when an undo entry can be removed or flagged because a transaction with which the undo entry is associated has been committed.

Storing the modification to the page may comprise placing a log buffer entry describing the modification into the log buffer. Storing the modification may also comprise receiving an acknowledgement that the log buffer entry has been made durable in the active log. Thus, the database front end may be provided an acknowledgement once the log buffer entry has been preserved in the active log. Storing the modification may also comprise taking an action in response to the acknowledgement. The action may be, for example, committing a transaction associated with the page, replying to an operation associated with the page, releasing a lock associated with the page, and so forth. For example, waiting to commit the transaction associated with the page until after the acknowledgement is received by the database front end may be important for ensuring that write ahead logging is performed so modifications to pages are preserved in the log before they are committed.

Method 200 also includes evicting the page from memory at 230. The page may be evicted when the page is replaced in the buffer pool. The page may be replaced in the buffer pool, for example, because the page has not been accessed by an active transaction for some time, an active transaction needs space for a different page in the buffer pool, and so forth. When the page is evicted at 230, a page write otherwise associated with the eviction may be elided. Eliding the page write may preserve I/O bandwidth by avoiding writing full pages back to a durable storage media. Further, because pages may be retrieved using single page recovery from a log, preserving up-to-date pages may reduce system performance by using system resources to store information that is already stored in the log.

Figure 3:
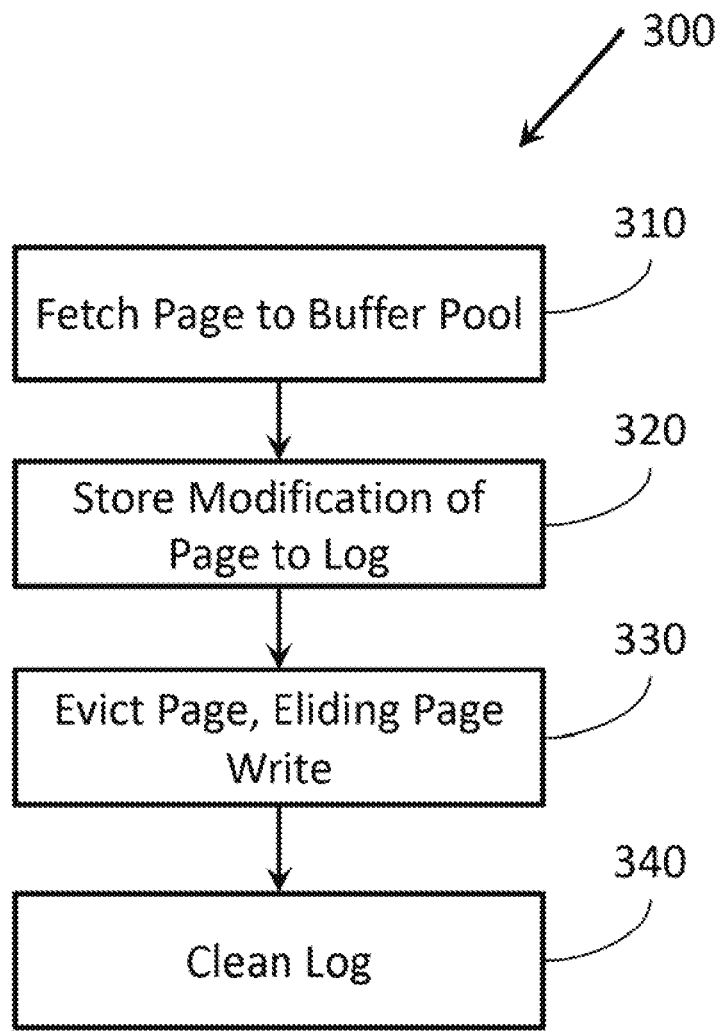
FIG. 3 illustrates another flowchart of example operations associated with page modification.

FIG. 3 illustrates a method 300 associated with page fetching and eviction. Method 300 includes many actions similar to those described above with reference to method 200 (FIG. 2). For example, method 300 includes fetching a page to a buffer pool at 310, and storing a modification of the page to a log at 320, evicting a page while eliding a page write at 330.

Method 300 also includes cleaning the log at 340. The log may be cleaned by sequentially applying to the page image in the log, modifications identified in the series of linked log entries. In one example, cleaning the log may comprise replacing the page image in the log with a new prefix-consistent page image creating using single page recovery.

The log cleaning action at 340 may be performed by a background process operating in the back end of a database system. When the back end has resources available to perform log cleaning, the back end may apply modifications identified in log entries in the active log to the appropriate pages, and then preserve the log entries in the log archive. In some examples, the back end may prioritize performing single page recovery on pages that are requested by database front end, and on storing log entries in the active log to ensure that the database processes transactions quickly. Consequently, during periods of lower transaction activity (e.g., at night, during specified time periods), the back end may have resources available to perform various cleaning operations.

Figure 4:
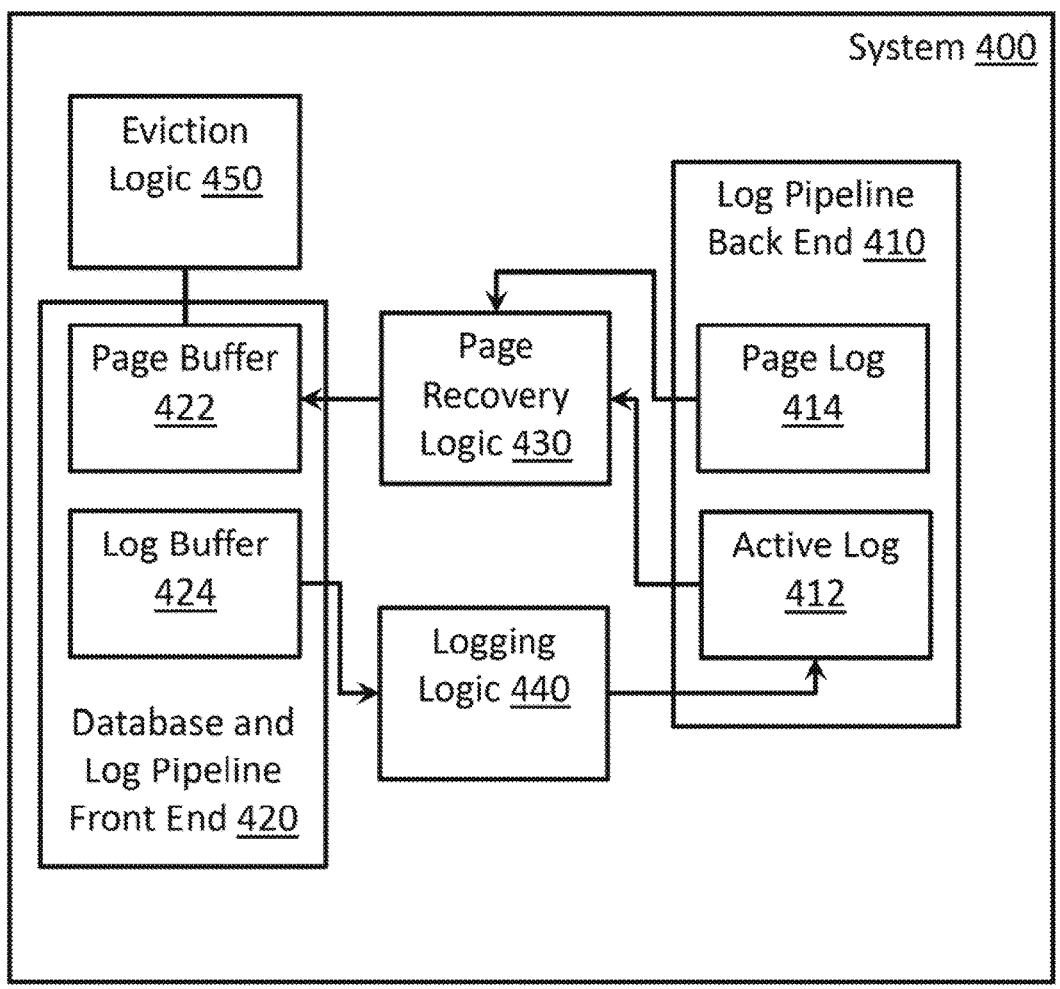
FIG. 4 illustrates an example system associated with page modification.

FIG. 4 illustrates a system 400. System 400 includes a log pipeline back end 410. Log pipeline back end 410 comprises an active log 412 and a page log 414. Page log 414 may be a prefix-consistent page log. As described above, a prefix-consistent page log may ensure that pages have a state that reflects a valid snapshot of the page at some point in time. Prior states of pages may be retrieved by analyzing log entries in, for example, a log archive, and future states of pages may be constructed by building them from log entries.

System 400 also includes a database and log pipeline front end 420. Front end 420 may operate in a memory within system 400 (not shown). The memory may be, for example, a cache, a RAM, and so forth. Front end 420 includes a page buffer 422. Page buffer 422 may store active pages (e.g., pages which are currently being operated by the database). Front end 420 also includes a log buffer 424. Log buffer 424 may serve as a pipeline for log entries to be made durable in active log 412. Log entries may describe modifications made to pages. Consequently, when a modification is made to a page in page buffer 422, and that modification is intended to be made durable, a log entry describing that modification may be placed into log buffer 424, which may initiate the process of making that modification durable by, for example, preserving the log entry in active log 412.

System 400 also includes a page recovery logic 430. Page recovery logic 430 may construct a page from an image of the page in page log 414 and from log entries associated with the page in active log 412. Page recovery logic 430 may construct the page upon receiving a page fetch instruction associated with the page. Page recovery logic 430 may store the page into page buffer 422 after constructing the page from the image and the log entries. In one example, page recovery logic 430 may be a process that operates within log pipeline back end 410. In this example, storing the page into page buffer 422 may include transmitting the page (e.g., via a network connection, an I/O bus) to database and log pipeline front end 520.

In one example, page log 414 may comprise a sparse page log and a page log archive. In this example, single page recovery log may obtain the image of the page from the page log archive when the image of the page is not found in the sparse page log. Using a sparse page log may be useful when some pages are accessed by the database more often than others. Pages preserved in a sparse page log may be retrieved faster than pages that must be retrieved from a log archive.

System 400 also includes a logging logic 440. Logging logic 440 may make log entries from log buffer 424 durable in active log 412. In one example, logging logic 440 may facilitate transmission of log entries placed in log buffer 424 to the log pipeline back end 410. Logging logic may also confirm, to front end 420, when log entries have been made durable. Confirming when log entries have been made durable may facilitate, for example, committing transactions associated with the log entries, responding to queries, releasing locks, and so forth.

System 400 also includes an eviction logic 450. Eviction logic 450 may evict the page from page buffer 422 when the page is replaced in page buffer 422. The eviction logic may cause page writes associated with the eviction to be elided. In one example, the elision of the page writes may be a result of eviction logic 450 not being configured to place pages into a buffer that causes the pages to be written back to log pipeline back end 410. Thus, when, for example, a page is replaced in page buffer 422, eviction logic 450 may identify a page to be evicted, at which point that page is simply overwritten within page buffer 422. As described above, evicting the page, while eliding a page write that might otherwise be associated with the eviction, may reduce the burden on I/O bandwidth and/or other resources associated with evicting the page compared to a page write that writes the page back to a media.

Figure 5:
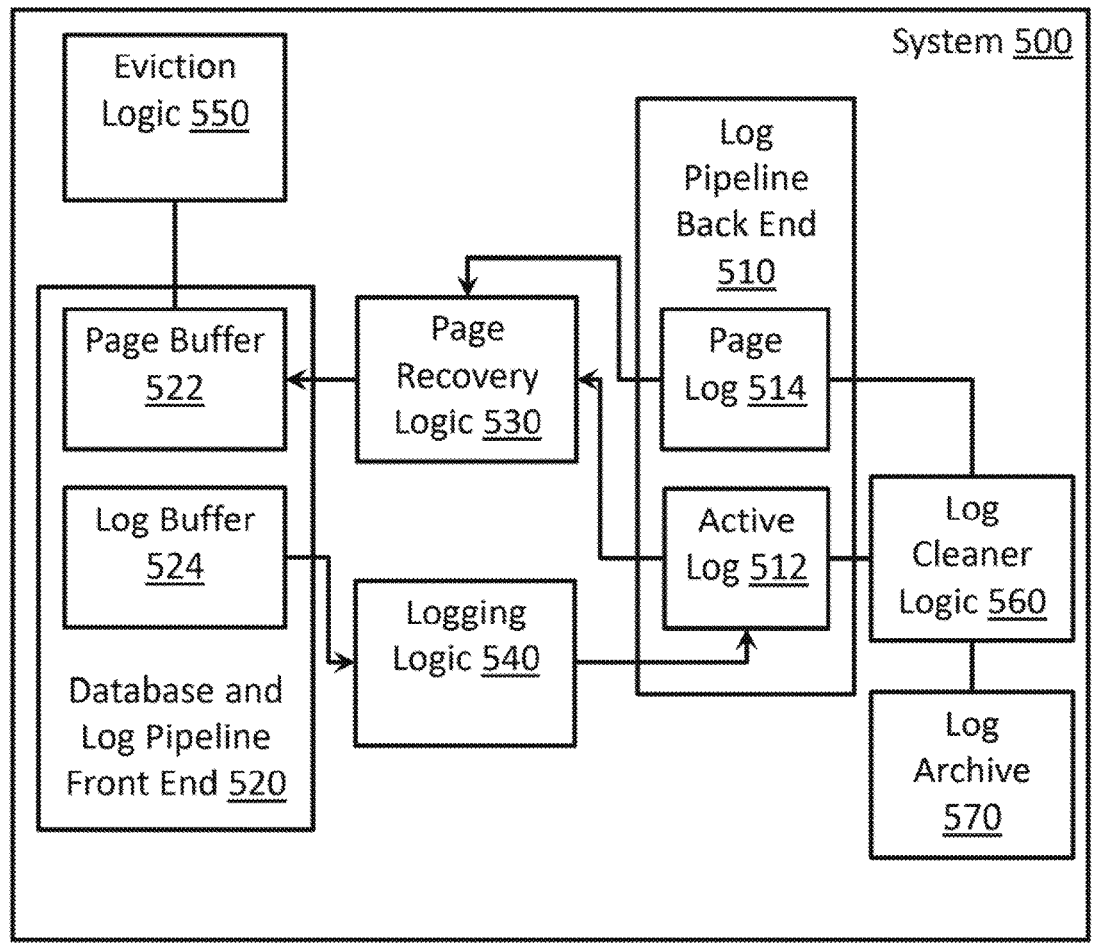
FIG. 5 illustrates another example system associated with page modification.

FIG. 5 illustrates a system 500 associated with page fetching and eviction. System 500 includes several items similar to those described above with reference to system 400 (FIG. 4). For example, system 500 includes a log pipeline back end 510 containing an active log 512 and a page log 514, a database and log pipeline front end 520 containing a page buffer 522 and a log buffer 524, a page recovery logic 530, a logging logic 540, and an eviction logic 550.

System 500 also includes a log cleaner logic 560. Log cleaner logic may apply modifications described by log entries in active log 512 to corresponding pages in page log 514. In one example, log cleaner logic may apply modifications to pages in page log 514 by performing single page recovery techniques to bring the pages up to a more current state. In other examples, page cleaner logic may update pages within page log 514 based on the ordering of log entries within active log 512.

System 500 also includes a log archive 570. Log cleaner 560 may move log entries from active log 512 to log archive 570 after applying the modifications described by the log entries in active log 512 to the corresponding pages in page log 514. The log archive may be useful in the event of a failure of a portion of system 500 that requires recovery of pages from a prior state. For example, if page log 514 is lost, pages may be recovered from log archive 570 by performing single page recovery using log entries stored in log archive 570. In another example, if an administrator needs to review old logs to analyze a transaction after it has completed (e.g., due to an error, a security breach, and so forth), these logs may be retrieved from log archive 570.

Figure 6:
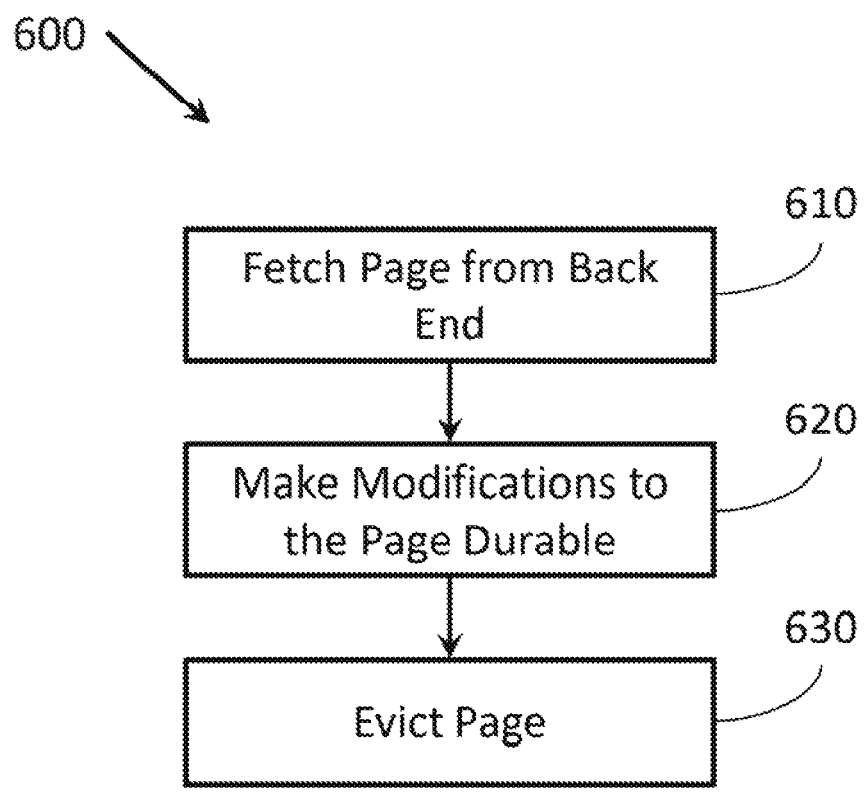
FIG. 6 illustrates another flowchart of example operations associated with page modification.

FIG. 6 illustrates a method 600 associated with page fetch and eviction. Method 600 includes fetching a page from a database back end at 610. The page may be fetched to a database front end. The page may be fetched by applying single page recovery to a page image retrieved from a page log in the database back end and log entries associated with the page image retrieved from an active log in the database back end.

Method 600 also includes making modifications to the page durable in the active log at 620. The modifications made durable may have originally been made to the page while the page is being operated on in the database front end.

Method 600 also includes evicting the page from the database front end at 630. The page may be evicted when the page is replaced in the database front end. When the page is evicted, page writes associated with the eviction may be elided.

Figure 7:
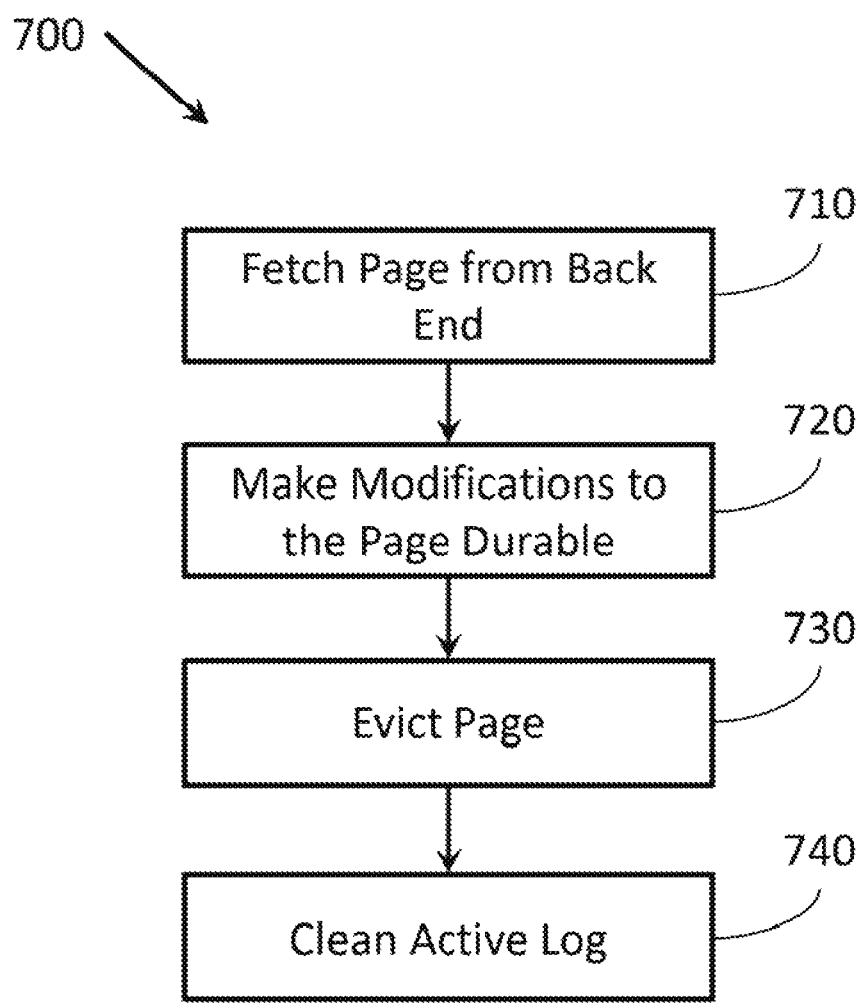
FIG. 7 illustrates another flowchart of example operations associated with page modification.

FIG. 7 illustrates a method 700 associated with page fetch and eviction. Method 700 includes several actions similar to those described above with reference to method 600 (FIG. 6). For example, method 700 includes fetching a page from a back end at 710, making modifications to the page durable at 720, and evicting the page at 730.

Method 700 also includes cleaning the active log at 740. Cleaning the active log may include applying the log entries to the page image in the page log. Cleaning the active log may also include archiving the log entries.

Figure 8:
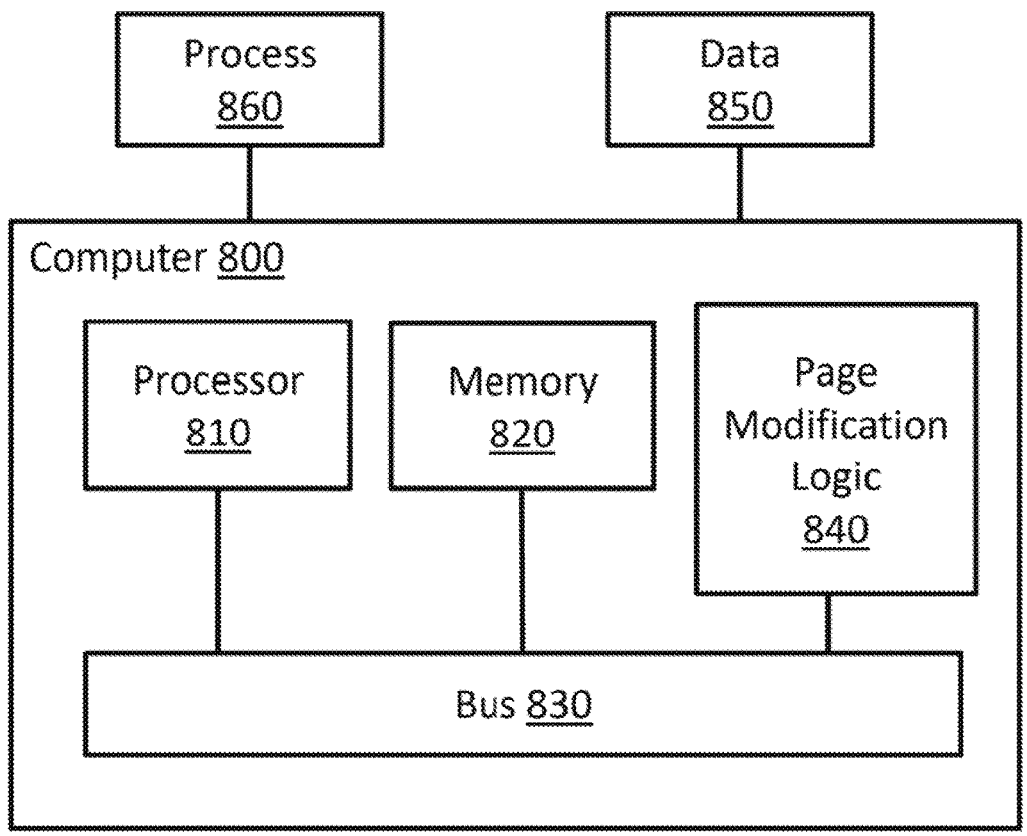
FIG. 8 illustrates an example computing device in which example systems and methods, and equivalents, may operate.

FIG. 8 illustrates an example computing device in which example systems and methods, and equivalents, may operate. The example computing device may be a computer 800 that includes a processor 810 and a memory 820 connected by a bus 830. The computer 800 includes a page modification logic 840. In different examples, page modification logic 840 may be implemented as a non-transitory computer-readable medium storing computer-executable instructions in hardware, software, firmware, an application specific integrated circuit, and/or combinations thereof.

The instructions may also be presented to computer 800 as data 850 and/or process 860 that are temporarily stored in memory 820 and then executed by processor 810. The processor 810 may be a variety of various processors including dual microprocessor and other multi-processor architectures. Memory 820 may include volatile memory (e.g., read only memory) and/or non-volatile memory (e.g., random access memory). Memory 820 may also be, for example, a magnetic disk drive, a solid state disk drive, a floppy disk drive, a tape drive, a flash memory card, an optical disk, and so on. Thus, memory 820 may store process 860 and/or data 850. Computer 800 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A non-transitory computer-readable medium storing computer-executable instructions that when executed by a computer cause the computer to:

fetch a page to a buffer pool in a memory to obtain a recovery version of the page;

use single page recovery from at least one of a log and a backup to update the recovery version of the page into a current version of the page stored in the memory;

store a modification of the current version of the page to the log, wherein the modification is stored as a log entry using write ahead logging without writing to the current version of the page stored in the memory; and evict the current version of the page from the memory when the page is replaced in the buffer pool, eliding a page write associated with the eviction, wherein the eviction of the page occurs prior to writing the modification to the current version of the page stored in the memory.

2. The non-transitory computer-readable medium of claim 1, wherein a representation of the current version of the page is stored and maintained in the log as a page image that is pre-fix consistent and a series of linked log entries that identify a sequence of modifications made to the current version of the page.

3. The non-transitory computer-readable medium of claim 2, wherein the instructions further cause the computer to:

clean the log by sequentially applying to the page image in the log, modifications identified in the series of linked log entries.

4. The non-transitory computer-readable medium of claim 3, wherein cleaning the log comprises replacing the page image in the log with a new prefix-consistent representation of the page image created using single page recovery.

5. The non-transitory computer-readable medium of claim 1, wherein the log entry is one of: a redo entry that describes modifications to make to the page image in the log to bring the page image in the log up-to-date, and an undo entry that identifies a redo entry to roll back to restore the page image in the log to a prior state.

6. The non-transitory computer-readable medium of claim 1, wherein the log comprises a log buffer, an active log, and a page log, where the log buffer serves as a front end of a pipeline between the memory and the active log, and where storage and handling of log entries serve as a back end of the pipeline.

7. The non-transitory computer-readable medium of claim 6, wherein the handling of log entries comprises managing redo and undo entries, and log cleaning.

8. The non-transitory computer-readable medium of claim 6, wherein the instructions to cause the computer to store the modification to the page further comprise instructions to cause the computer to:

place a log buffer entry describing the modification into the log buffer;

receive an acknowledgement that the log buffer entry has been made durable in the active log; and perform an action in response to the acknowledgement.

9. The non-transitory computer-readable medium of claim 8, wherein the action is one or more of:

committing a transaction associated with the page, replying to an operation associated with the page, and releasing a lock associated with the page.

10. A system, comprising:

a log pipeline back end comprising an active log and a prefix-consistent page log;

a database and log pipeline front end operating in a memory, comprising a page buffer to store active pages and a log buffer that serves as a pipeline for log entries to be made durable in the active log, where log entries describe modifications made to the active pages resident in a memory prior to updating the memory;

a page recovery logic to, in response to receiving a page fetch instruction associated with a page, construct a constructed page from an image of the page in the page log and log entries associated with the page in the active log, and store the constructed page in the page buffer;

a logging logic to make log entries from the log buffer durable in the active log, and to confirm when log entries are made durable to the front end; and an eviction logic to evict the constructed page from the page buffer when the constructed page is replaced in the page buffer, eliding a page write associated with the eviction, wherein the eviction of the constructed page occurs prior to writing the modifications made to the active pages to the memory.

11. The system of claim 10, comprising a log cleaner logic to apply modifications described by log entries in the active log to corresponding pages in the page log.

12. The system of claim 11, comprising a log archive, where the log cleaner logic moves the log entries in the active log to the log archive after applying the modifications described by the log entries in the active log to the corresponding pages in the page log.

13. The system of claim 10, wherein the page log comprises a sparse page log, and a page log archive, and wherein the page recovery logic obtains the image of the page from the page log archive when the image of the page is not found in the sparse page log.

14. A method, comprising:

fetching a page from a database back end to a database front end by applying single page recovery to a page image retrieved from a page log in the database back end and log entries associated with the page image retrieved from an active log in the database back end to create a current version of the page image stored in a memory associated with the database front end;

making modifications to the page image stored in the memory associated with the database front end durable in the active log without writing the modifications to the memory; and evicting the page image stored in the memory associated with from the database front end when the page is replaced in the database front end, eliding a page write associated with the eviction, wherein the eviction of the page occurs prior to writing the modifications to the memory.

15. The method of claim 14, further comprising:

cleaning the active log by applying the log entries to the page image in the page log; and archiving the log entries.

* * * * *